United States Patent [19]

Kasdan et al.

[11] Patent Number: 5,121,436
[45] Date of Patent: Jun. 9, 1992

[54] METHOD AND APPARATUS FOR GENERATING A PLURALITY OF PARAMETERS OF AN OBJECT IN A FIELD OF VIEW

[75] Inventors: Harvey L. Kasdan, Van Nuys; John Liberty, Manhattan Beach, both of Calif.

[73] Assignee: International Remote Imaging Systems, Inc., Chatsworth, Calif.

[21] Appl. No.: 350,400

[22] Filed: May 11, 1989

Related U.S. Application Data

[63] Continuation-in-part of Ser. No. 85,985, Aug. 14, 1987, abandoned.

[51] Int. Cl.⁵ .............................................. G06K 9/36
[52] U.S. Cl. .......................................... 382/6; 382/27; 382/60
[58] Field of Search ................... 382/6, 17, 23, 25, 26, 382/27, 28, 60, 9

[56] References Cited

U.S. PATENT DOCUMENTS

| | | |
|---|---|---|
| 4,060,713 | 11/1977 | Golay ................................ 382/6 |
| 4,097,845 | 6/1978 | Bachs ................................ 382/6 |
| 4,453,266 | 6/1984 | Bachs ................................ 382/6 |
| 4,538,299 | 8/1985 | DeForest .......................... 382/6 |
| 4,550,437 | 10/1985 | Kobayashi et al. ............. 382/27 |

Primary Examiner—David K. Moore
Assistant Examiner—Yon Jung
Attorney, Agent, or Firm—Limbach & Limbach

[57] ABSTRACT

A method and an apparatus for generating a plurality of parameters of an object in a field of view is disclosed. An electrical image of the field of view is formed. The electrical image is processed to form a plurality of different representations of the electrical image where each different representation is a representation of a different parameter of the field of view. The positional information, which represents the boundary of the object, is generated. In response to the positional information that represents the boundary of the object being generated, corresponding locations in each of the different representations is traced. The different parameters from each of the different represents are calculated as the locations are traced in each of the different representations.

18 Claims, 13 Drawing Sheets

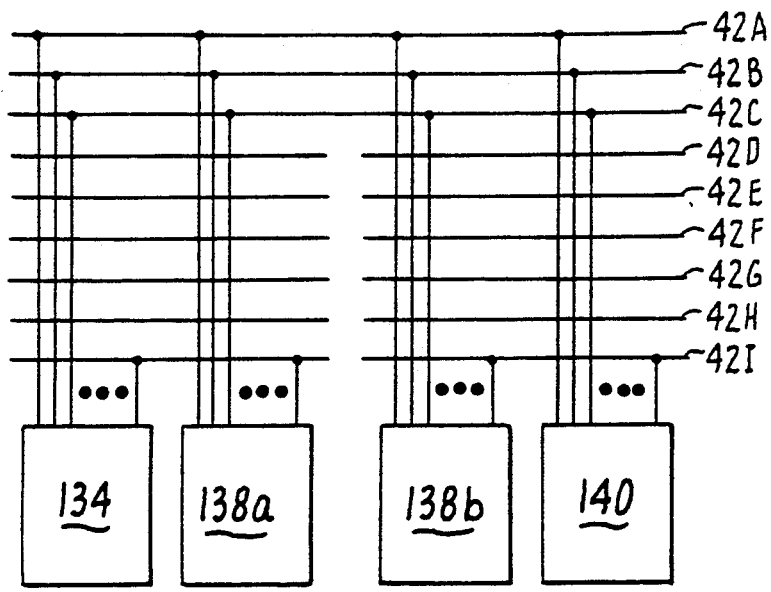
FIG.8a.
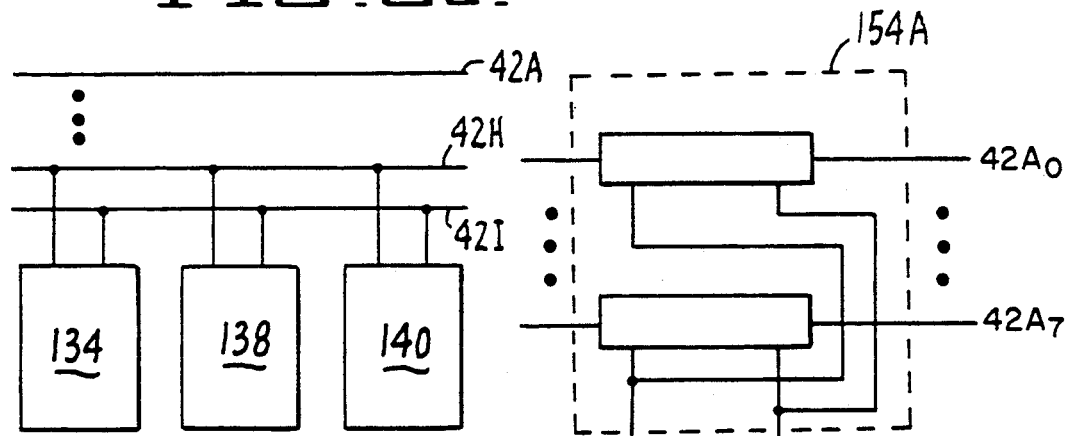
FIG.8b.
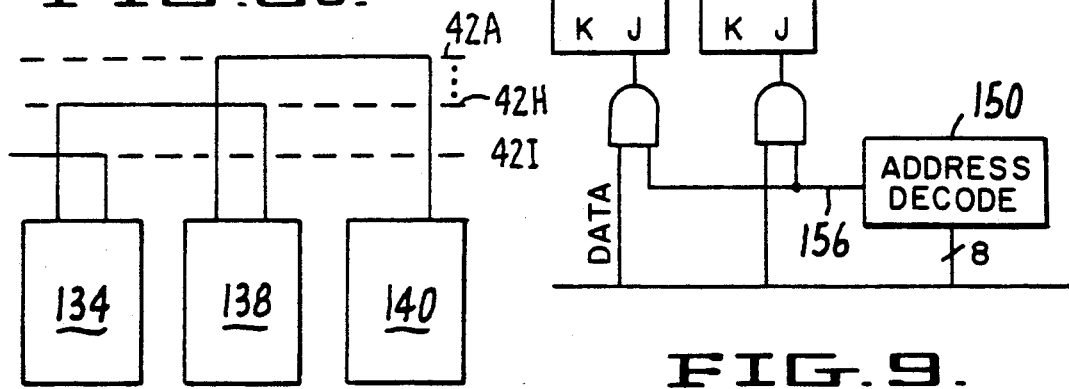
FIG.8c.
FIG.9.

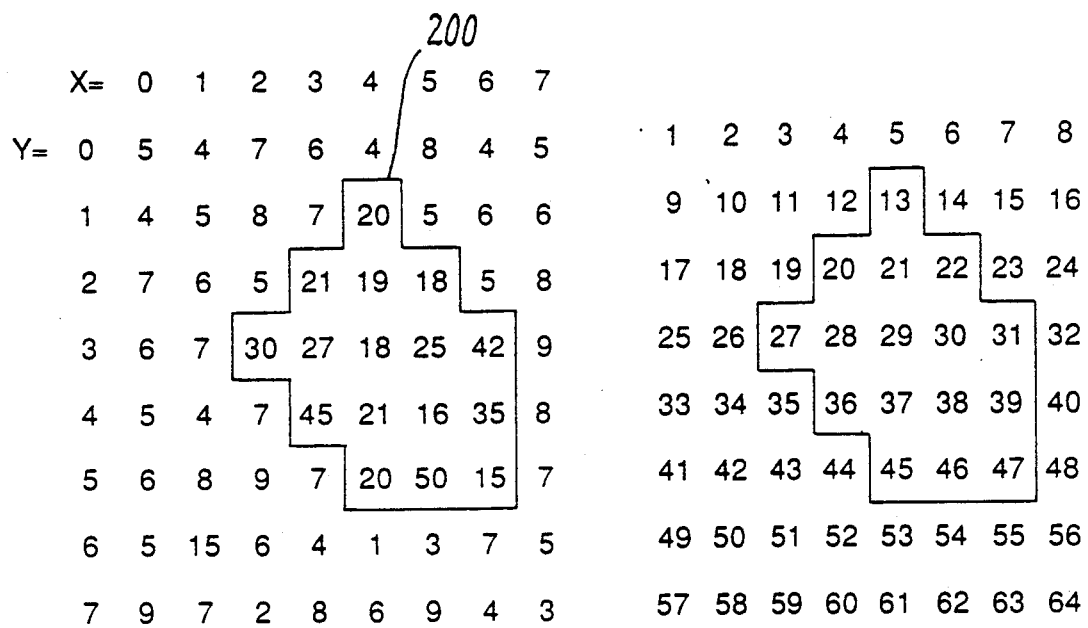
FIG.16
GREEN'S FUNCTION KERNEL FOR AREA
FIG.17.
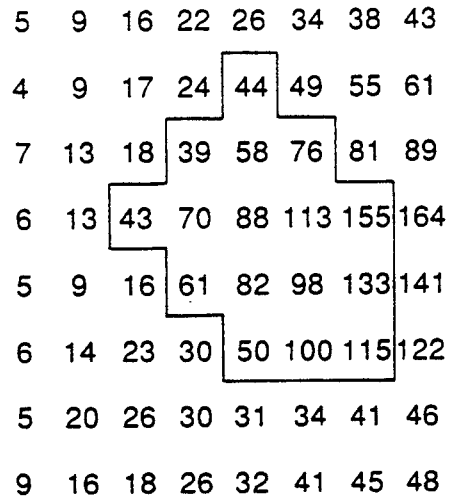
GREEN'S FUNCTION KERNEL FOR INTEGRATED OPTICAL DENSITY
FIG.18.

AREA = 152 − 136 = 16          IOD = 523 − 101 = 422

FIG. 20                     FIG. 21.

METHOD AND APPARATUS FOR GENERATING A PLURALITY OF PARAMETERS OF AN OBJECT IN A FIELD OF VIEW

This is a continuation-in-part application of a copending application Ser. No. 085,985, filed on Aug. 14, 1987 now abandoned, assigned to the present assignee.

TECHNICAL FIELD

The present invention relates to a method and an apparatus for generating a plurality of parameters of an object in a field of view, and more particularly, to a method and apparatus where a plurality of parameters of an object in a field of view are determined in response to positional information representing the boundary of the object being provided.

BACKGROUND ART

Microscopical image analysis is well known in the art. See, for example, U.S. Pat. No. 4,097,845. The purpose of image analysis is to determine particular qualities of objects in the field of view. In particular, in the case of image analysis of microscopical samples such as biopsies, blood or urine, it is highly desirable to determine properties of the particles in view such as: area, mass density, shape, etc. However, in order to determine the particular parameter of the particles in the object of view, the boundary of the particles must first be located.

In U.S. Pat. No. 4,097,845, a method of locating the boundary of particles is described using the technique of "neighbors of the neighbors".

U.S. Pat. No. 4,060,713 also discloses an apparatus for processing two-dimensional data. In that reference, an analysis of the six nearest neighbors of an element is made.

U.S. Pat. No. 4,538,299 discloses yet another method for locating the boundary cf a particle in the field of view.

A urinalysis machine manufactured and sold by International Remote Imaging Systems, Inc. under the trademark the Yellow IRIS ™, has used the teaching of the '299 patent to locate the boundary of a particle and thereafter to determine the area of the particle. However, The Yellow IRIS ™ used the positional information of the boundary of a particle to determine only a single parameter of the particle. Further, The Yellow IRIS ™ did not generate a representation that is a representation of the parameter of area in the field of view, which is separate and apart from the image containing the representation that has the boundary of the particle.

SUMMARY OF THE INVENTION

A method and apparatus is provided for generating a plurality of parameters of an object in a field of view. The apparatus has imaging means for forming an electrical image of the field of view. Means is provided for segmenting the electrical image to form a plurality of different representations of the electrical image wherein each different representation is a representation of a different parameter of the field of view. Generating means provides the positional information that represent the boundary of the object. Tracing means locates positions in each of the different representations in response to the positional information generated. Finally, calculating means provides the different parameters from each of the different representations based upon location traced in each of the different representations.

BRIEF DESCRIPTION OF THE DRAWINGS

FIG. 8(a-c) show various possible embodiments as a result of switching the data buses of the video image processor shown in FIG. 6.

FIG. 9 is a detail circuit diagram of a portion of the switch and logic unit of the video image processor shown in FIG. 6.

FIG. 16 is an example of a digitized image of the field of view with a particle contained therein.

FIG. 17 is an example of the electrical image shown in FIG. 16 processed to form a representation of the electrical image which is a representation of the area of the field of view.

FIG. 18 is an example of the electrical image shown in FIG. 16 processed to form a representation of the electrical image which is a representation of the integrated optical density of the field of view.

FIG. 19 is an example of the electrical image shown in FIG. 16 processed to form a first representation containing the boundary of the object in the field of view, in accordance with the method as disclosed in U.S. Pat. No. 4,538,299.

FIG. 20 is an example of the calculation of the area of the object in the field of view of the example shown in FIG. 16 in accordance with the method of the present invention.

FIG. 21 is the calculation of the integrated optical density of the object in the field of view of the example shown in FIG. 16 in accordance with the method of the present invention.

DETAILED DESCRIPTION OF THE DRAWINGS

Figure 1:
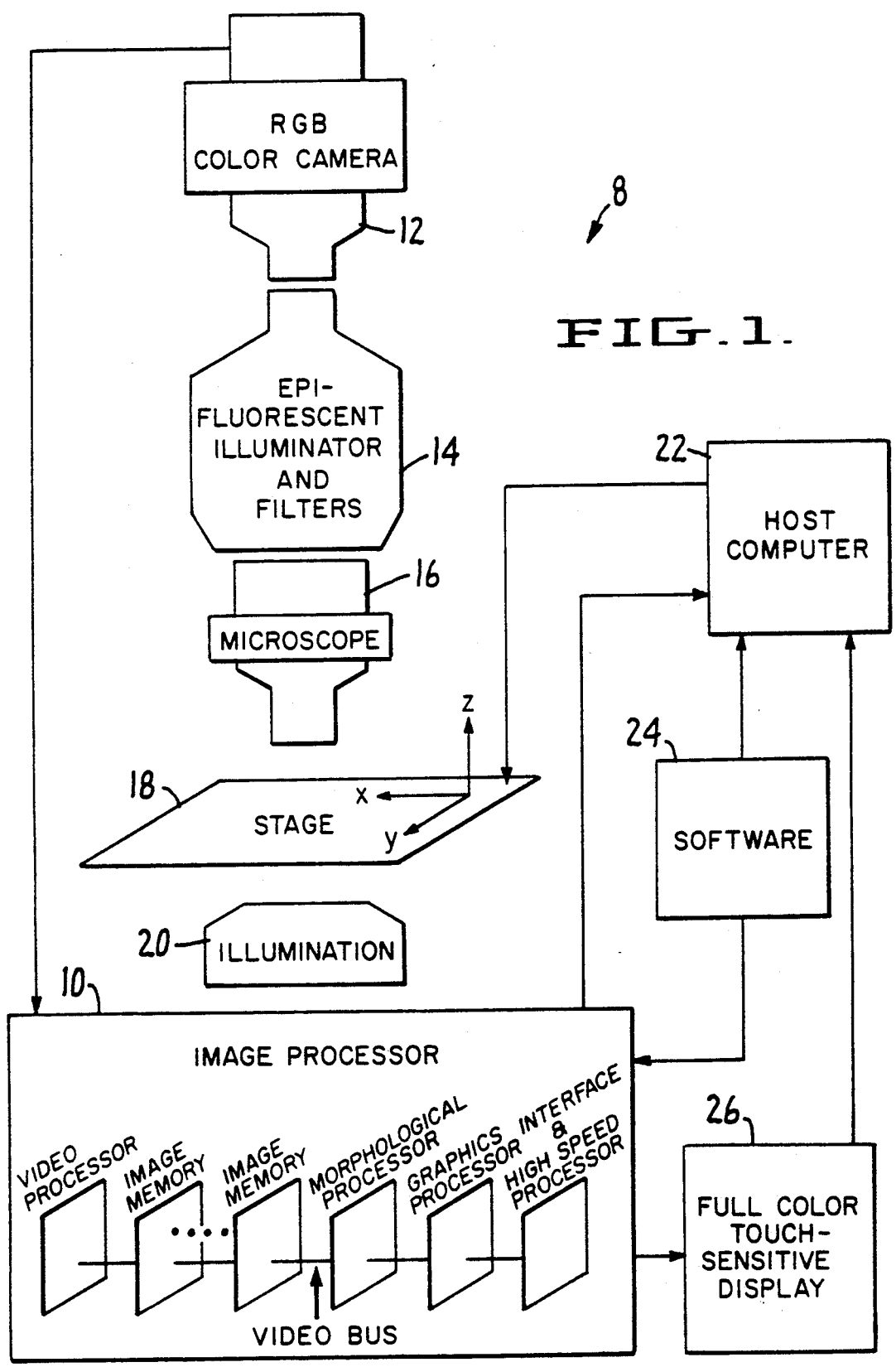
FIG. 1 is a schematic block diagram of an imaging system of the present invention.

Referring to FIG. 1 there is shown an imaging system 8 of the present invention. The imaging system 8 comprises a video image processor 10, which receives analog video signals from a color camera 12. The color camera 12 is optically attached to a fluorescent illuminator 14 which is focused through a microscope 16 and is directed at a stage 18. A source of illumination 20 provides the necessary electromagnetic radiation. The video imaging processor 10 communicates with a host computer 22. In addition, the host computer 22 has software 24 stored therein to operate it. Finally, a full color monitor display device 26 receives the output of the video image processor 10.

There are many uses for the video image processor 10. In the embodiment shown in FIG. 1, the imaging system 8 is used to analyze biological specimens, such as biopsy material, or constituents of blood. The biological specimen is mounted on a slide and is placed on the stage 18. The video image of the slide as taken by the color camera 12 through the microscope 16 is processed by the video image processor.

In preferred embodiment, the host computer 22 is a Motorola 68000 microprocessor and communicates with the video image processor 10 via a Q-bus. The Q-bus is a standard communication protocol developed by Digital Equipment Corporation.

Figure 2:
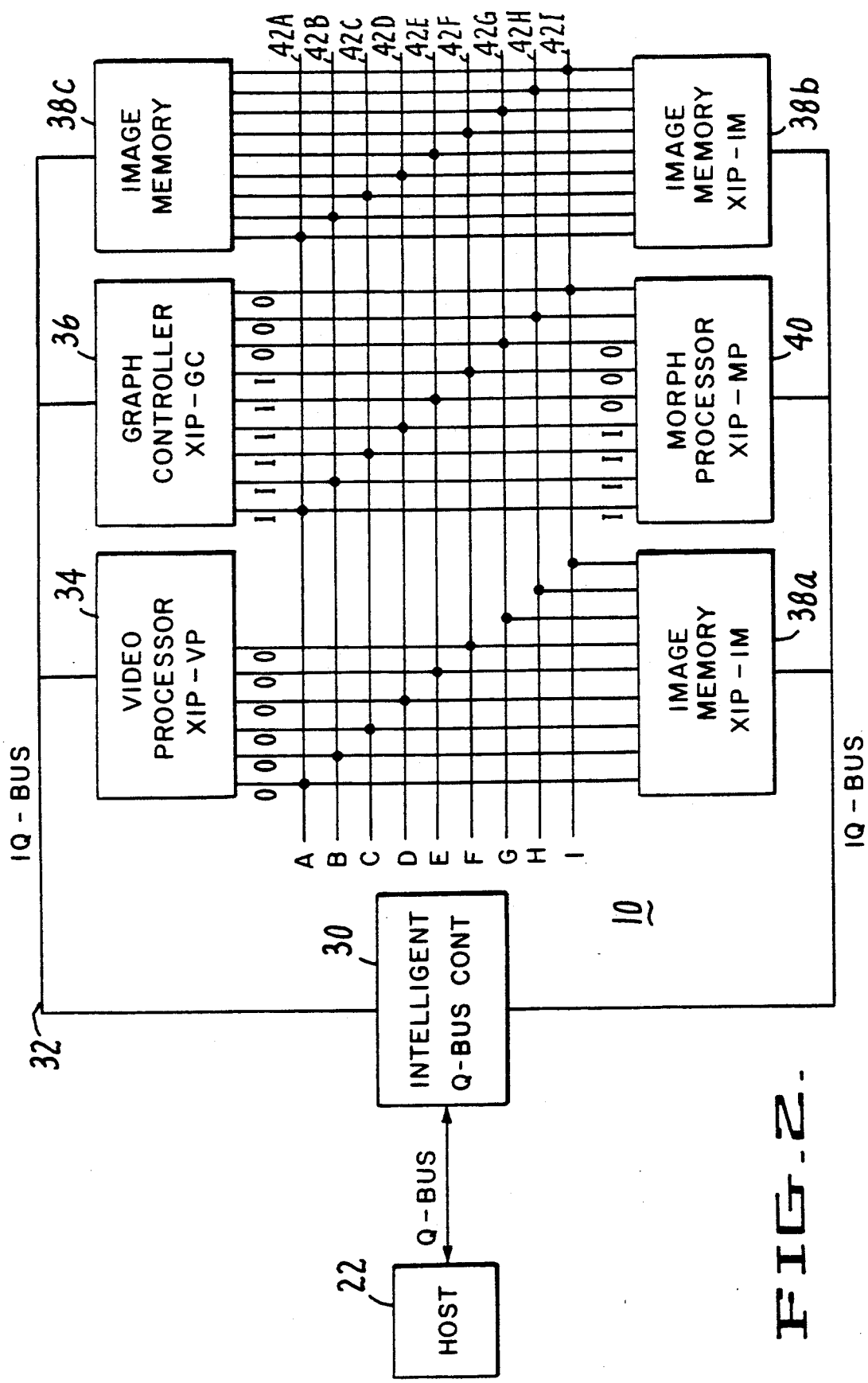
FIG. 2 is a block diagram of the video image processor of the imaging system of the present invention, shown with a plurality of modules, and a plurality of data buses.

As shown in FIG. 2, the video image processor 10 comprises a master controller 30 and a plurality of electronic digital modules. Shown in FIG. 2 are a plurality of processor modules: the video processor 34, graphic controller processor 36, morphological processor 40, and a plurality of image memory modules: image memory modules 38a, 38b and 38c. The image memory modules store data which is representative of the video images. The processor modules process the data or the video images The master controller 30 communicates with each one of the plurality of digital modules (34, 36, 38 and 40) via a control bus 32. In addition, the plurality of digital modules (34, 36, 38 and 40) communicate with one another via a plurality of data buses 42.

In the video image processor 10, the master controller 30 controls the operation of each one of the plurality of digital modules (34, 36, 38 and 40) by passing control signals along the control bus 32. The bus 32 comprises a plurality of lines. The bus 32 comprises 8 bit lines for address, 16 bit lines for data, 4 bit lines of control, one line for vertical sync and one line for horizontal sync. In addition, there are numerous power and ground lines. The 4 bits of control include a signal for clock, ADAV, CMD, and WRT (the function of these control signals will be described later).

The plurality of data buses 42, which interconnect the modules (34, 36, 38 and 40) with one another, comprise nine 8 bit wide data buses 42. The nine data buses 42 are designated as 42A, 42B, 42C, 42D, 42E, 42F, 42G, 42H, and 42I, respectively.

Within each module (34, 36, 38 and 40) is a communication means 54. Further, within each module is a logic unit means 52 which is responsive to the control signals on the control bus 32 for connecting the communication means 54 of each module to one or more of the data buses 42.

Figure 3:
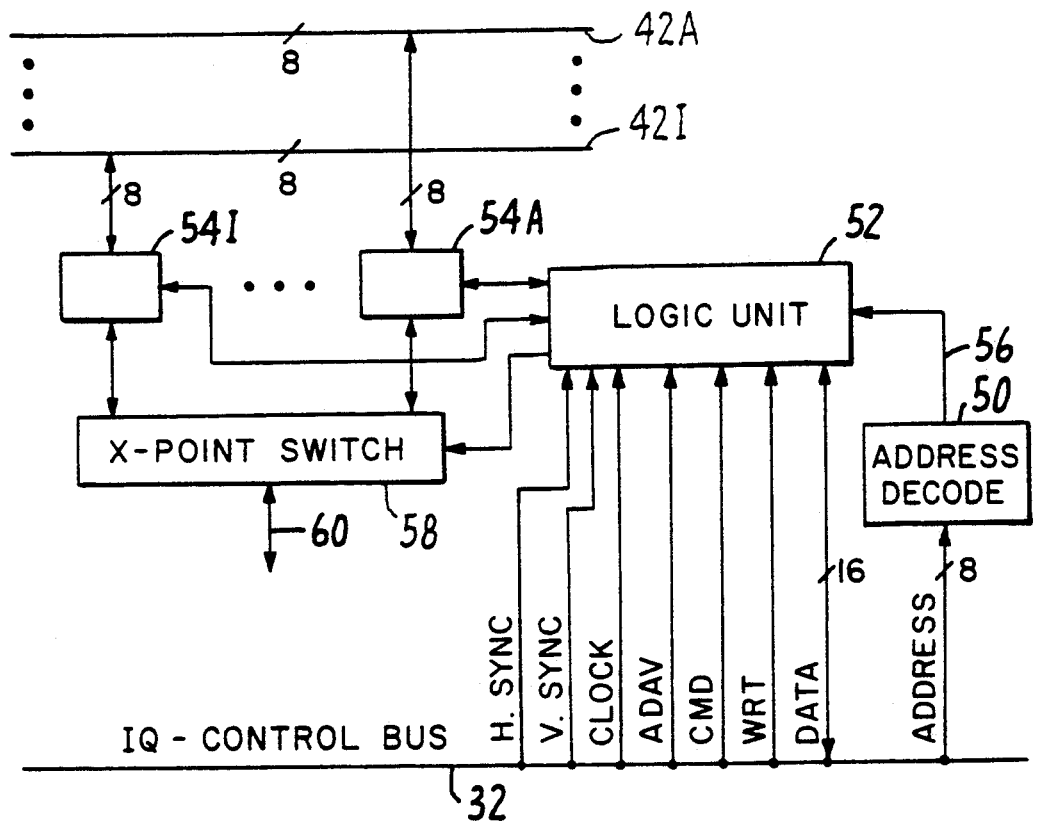
FIG. 3 is a schematic block diagram of the portion of each module of the video image processor with communication means, and logic control means to interconnect one or more of the data buses to the module.

Referring to FIG. 3 there is shown a schematic block diagram of the portion of each of the modules which is responsive to the control signals on the control bus 32 for interconnecting one or more of the data buses 42 to the communication means 54 within each of the modules. Shown in FIG. 3 is an address decode circuit 50. The address decode circuit 50 is connected to the eight address lines of the control bus 32. The address decode circuit 50 also outputs a signal 56 which activates its associated logic unit 52. Since each logic unit 52 has a unique address, if the address lines present on the address decode 50 matches the address for that particular logic unit 52, the address decode 50 would send a signal 56 to activate that logic unit 52. Within each module, there can be a plurality of logic units 52 each with an associated address decoder 50. Each of the plurality of logic units 52 can perform different tasks.

The logic unit 52 receives the 16 bits of data from the 16 bits of data portion of the control bus 32. In addition, the logic unit 52 can also be connected to the four control lines: clock, ADAV;, CMD, WRT, as previously described, of the control bus 32, and vertical sync and horizontal sync. The logic unit 52 will then control the operation of a plurality of tri-state transceivers 54A, 54B, 54C, 54D, 54E, 54F, 54G and 54I. This being understood that there are eight individual tri-state transceivers 54 for the group of tri-state transceivers 54A, and eight individual tri-state transceivers for the group of tri-state transceivers 54B, etc. The function of the tri-state transceivers 54 is to connect one or more of the data buses 42A to functions within the module of which the logic unit 52 and address decode circuit 50 is a part thereof. In addition, within the module, a cross-point switch 58 may be connected to all of the outputs of the tri-state transceivers 54 and multiplex the plurality of tri-state transceivers 54 into a single 8 bit wide bus 60.

Figure 4:
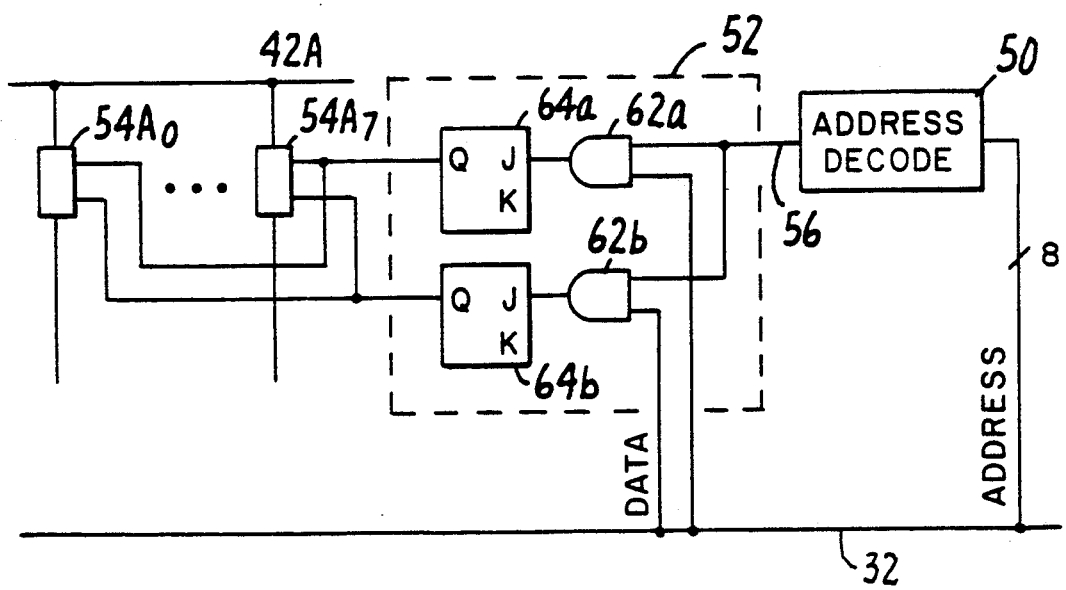
FIG. 4 is a detail circuit diagram of one implementation of the logic unit shown in FIG. 3.

Referring to FIG. 4 there is shown a simplistic example of the address decoder 50, the logic unit 52, and one of the group of transceivers 54A interconnecting with the bus 42A. As previously stated, the eight address signal lines of the control bus 32 are supplied to the address decoder 50. If the address supplied on the address lines of the control bus 32 correctly decodes to the address of the logic unit 52, the address decoder 50 sends a signal 56 going high which is supplied to the logic unit 52. The address decode circuit 50 can be of conventional design.

Logic unit 52 comprises two AND gates 62A and 62B whose outputs are connected to J-K flipflop 64a and 64B, respectively. The AND gates 62A and 62B receive at one of the inputs thereof the control signal 56 from the address decoder 50. The other input to the AND gates 62A and 62B are from the data lines of the control bus 32. If the address decoder 50 determines that the logic unit 52 is to be activated, as determined by the correct address on the address lines of the control bus 32, the control signal 56 going high gates in to the flipflop 64A and 64B the data present on the data lines of the control bus 32. The output of the J-K flipflop 64A and 64B are used to control the eight tri-state transceivers $54A_0 \ldots 54A_7$. Each of the eight tri-state transceivers has as one terminal thereof connected to one of the eight bit communication paths of the bus 42A. The other terminal of each of the tri-state transceivers 54A is connected to electronic elements within the module.

The tri-state transceivers 54A, as the name suggests, has three states. The transceivers 54A can provide communication to the data bus 42A. The tri-state transceivers 54A can provide data communication from the data bus 42A. In addition, the tri-state transceivers 54A can be in the open position in which case no communication occurs to or from the data bus 42A. As an example, the tri-state transceivers 54A are components manufactured by Texas Instruments designated as 74AS620. These tri-state transceivers 54A receive two inputs. If the inputs have the combination of 0 and 1, they denote communication in one direction. If the tri-state transceivers receive the inputs of 1 and 0, they denote communication in the opposite direction. If the tri-state transceivers 54A receive 0 0 on both input lines, then the tri-state transceivers 54A are in the open position. Since the tri-state transceivers $54A_0 \ldots 54A_7$ are all switched in the same manner, i.e. either all eight lines are connected to the data bus 42A, or they are not, the output of the flipflop 64A and 64B are used to control all eight transceivers to interconnect one of the data buses. The logic unit 52 can also comprise other flipflops and control gates to control other tri-state transceivers which are grouped in groups of eight to gang the switching of the selection of connection to one or more of the other data buses 42.

Because the interconnection of one or more of the data buses 42 to one or more of the plurality of modules (34, 36, 38 and 40), is under the control of the control bus 32, the data paths for the connection of the data buses 42 (A-I) can be dynamically reconfigured.

Figure 5A:
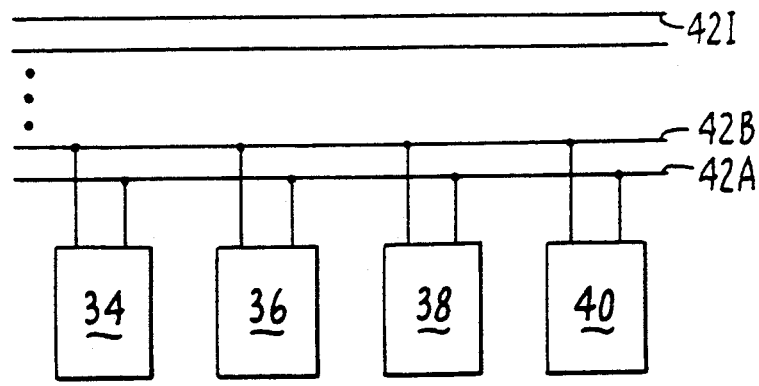
FIGS. 5(a-c) are schematic block diagrams of various possible configurations connecting the modules to the data buses.

Referring to FIG. 5a, there is shown one possible configuration with the dynamically reconfigurable data buses 42. Since each data bus 42 is 8 bits wide, the plurality of modules (34, 36, 38 and 40) can be connected to receive data from two data buses (e.g. 42A and 42B), simultaneously. This is data processing in the parallel mode in which 16 bits of data are simultaneously processed along the data bus. Thus, the data buses 42 can be ganged together to increase the bandwidth of data transmission.

Figures 5B, 5C:
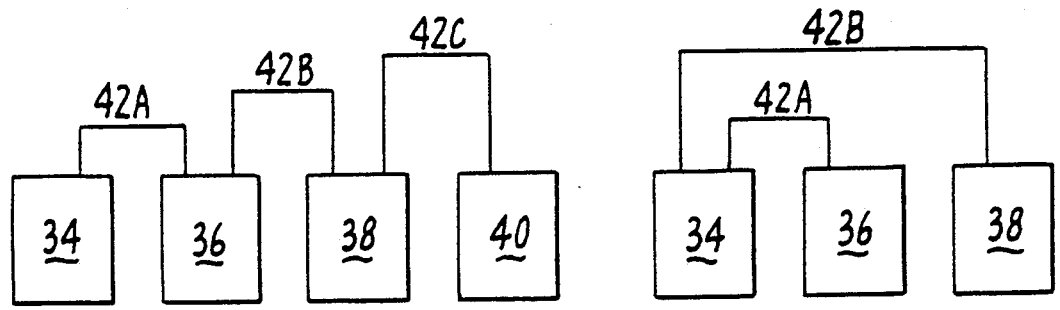

Referring to FIG. 5b, there is another possible configuration for the data buses 42. In this mode of operation, module 34 can transmit data on data bus 42A to module 36. Module 36 can communicate data with module 38 along the data bus 42B. Finally, module 38 can communicate with module 40 along the data bus 42C. can flow from one module to another sequentially or simultaneously since data is flowing on separate and unique data buses.

Referring to FIG. 5c, there is shown yet another possible configuration for the data bus 42. In this mode the operation is known as macro interleaving. If, for example, the module 34 is able to process or transmit data faster than the modules 36 or 38 can receive them, module 34 can send every odd data byte to module 36 along data bus 42A and every even data byte along bus 42B to the module 38. In this manner, data can be stored or processed at the rate of the fastest module. This is unlike the prior art where a plurality of modules must be operated at the speed of the slowest module.

Thus, as can be seen by examples shown in FIGS. 4a-4c, with a dynamically reconfigurable data bus structure, a variety of data transmission paths, including but not limited to those shown in FIGS. 4(a-c), can be dynamically and electronically reconfigured.

Figure 6:
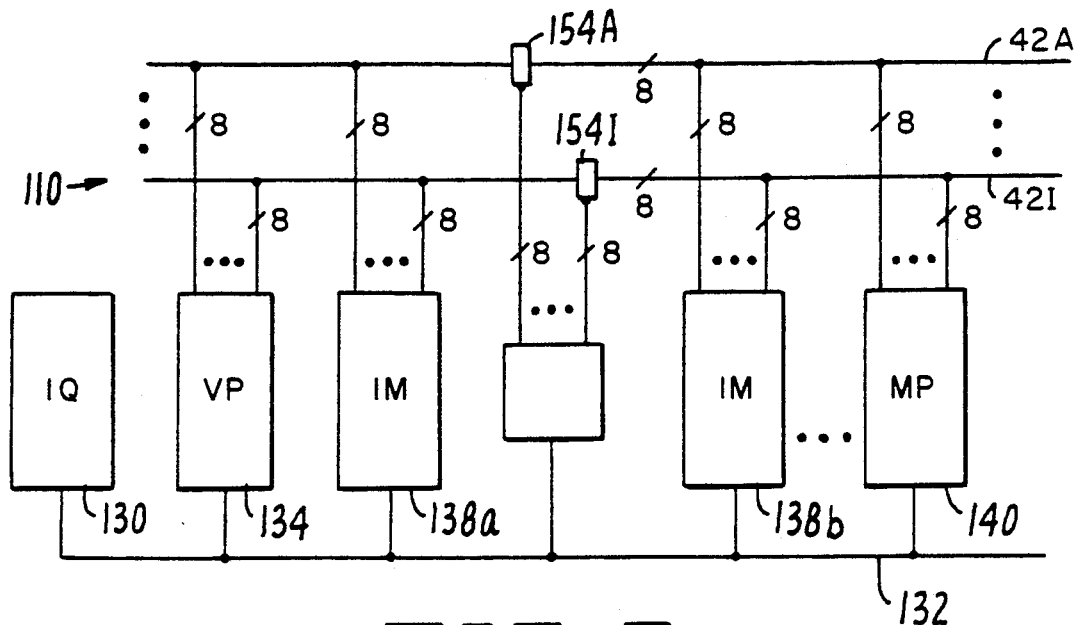
FIG. 6 is a schematic block diagram of another embodiment of a video image processor shown with a plurality of data buses which can be electronically switched.

Referring to FIG. 6, there is shown yet another embodiment of a video image processor 110. The video image processor 110, similar to the video image processor 10 comprises a master controller 130 and a plurality of digital modules 134, 136 (not shown), 138 (A-B) and 140. These modules, similar to the modules 34, 36, 38 and 40, perform the respective tasks of image processing and image storing. The master controller 130 communicates with each one of the modules via a control bus 132. Each one of the modules 134-140 is also connected to one another by a plurality of data buses 42A-42I. Similar to the video image processor 10, there are nine data buses, each bus being 8 bits wide.

The only difference between the video image processor 110 and the video image processor 10 is that along each of the data buses 42 is interposed a switch means 154 controlled by a logic unit 152 which is activated by an address decode circuit 150. This is shown in greater detail in FIGS. 7 and 9. As can be seen in FIG. 6, the switch means 154A . . . 154I are interposed between the image memory module 138A and image memory module 138B. That is, the switch means 154A . . . 154I, divide the data buses 42A . . . 42I into two sections: the first section comprising of the video processor module 134 and the image memory module 138A; the second part comprising the morphological processor 140 and the second image memory module 138B. The switch means 154 provide the capability of either connecting one part of the data bus 42A to the other part or leaving the data bus open, i.e. the data bus severed.

Referring to FIGS. 8a-8c, there is shown various configurations of the possible data bus structure that results from using the switch means 154A-154I.

FIG. 8a shows nine data buses 42A-42I, wherein the switch means 154A, 154B and 154C connect the data buses 42A, 42B and 42C into one continuous data bus. However, the switch means 154D . . . 154I are left in the open position thereby severing the data buses 42D . . . 42I into two portions. In this mode of operation, parallel processing can occur simultaneously using the data buses 42D . . . 42I by the modules 134, and 138A and by the modules 138B and 140. In addition, serial or pipeline processing can occur along the data buses 42A . . . 42C. As before, with the switch means 154A . . . 154I, dynamically selectable, total parallel processing as shown in FIG. 8b or total pipeline processing as shown in FIG. 8c are also possible. In addition, of course other configurations including but not limited to the macro interleave configuration of FIG. 5c, are also possible.

Figure 7:
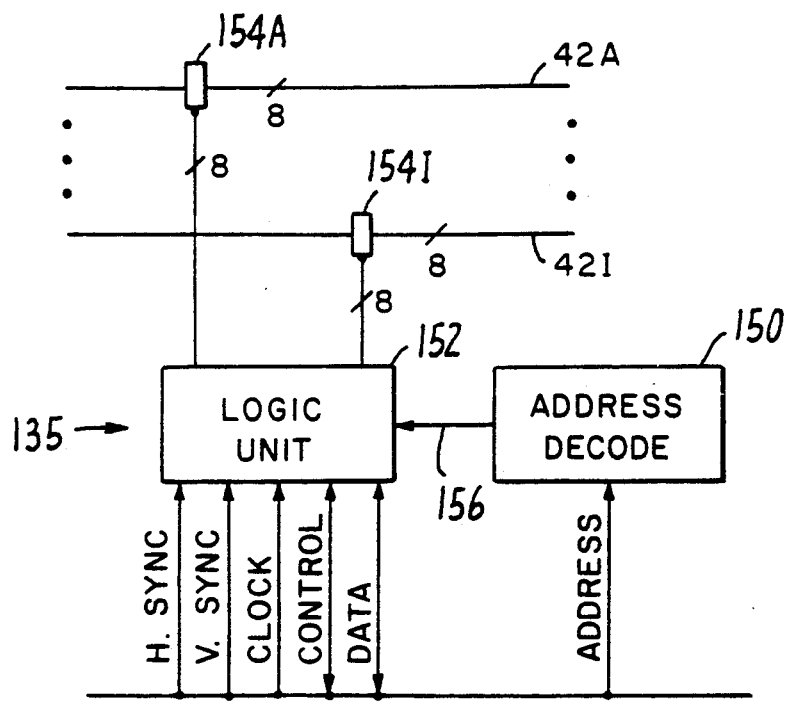
FIG. 7 is a schematic block diagram of the portion of the video image processor shown in FIG. 6 showing the logic unit and address decode unit and the switching means to electronically switch the data buses of the video image processor shown in FIG. 6.

Referring to FIG. 7, there is shown a schematic block diagram of the electronic circuits used to control the data 42A . . . 42I of the video image processor 110. As previously stated, a switch means 154 is interposed between two halves of each data bus 42. Shown in FIG. 7, is the switch means 154A interposed in the data bus 42A and the switch means 154I interposed in the data bus 42I. Each one of the switch means 154 is controlled by the logic unit 152 which is activated by the address decode circuit 150. Similar to the address decode circuit 50, the address decode 150 is connected to the eight address lines of the control bus 132. If the correct address lines is detected, the control signal 156 is sent to the logic unit 152. The control signal 156 activates the logic unit 152 which in turn activates one or more of the switch means 154.

Referring to FIG. 9, there is shown a detailed simplistic schematic circuit diagram of the logic unit 152 and the switch means 154A. As can be seen, the logic 152 is identical to the logic unit 52. The switch means 154 (a tri-state transceiver) interconnects one half of one of the bus lines to the other half of the bus line 42. In all other respects, the operation of the switch means 154, logic unit 152, and the address decode circuit 150 is identical to that shown and described for the address decode circuit 50, logic unit 52, and switch means 54.

As previously stated, the reconfigurable data buses 42, interconnect the plurality of modules (34, 36, 38 and 40) to one another. The modules comprise a plurality of processor modules and a plurality of memory modules. With the exception of the communication means, logic unit and address decode circuit, the rest of the electronic circuits of each module for processing or storing data can be of conventional design. One of the processor modules 34 is the video processor module.

Figure 10:
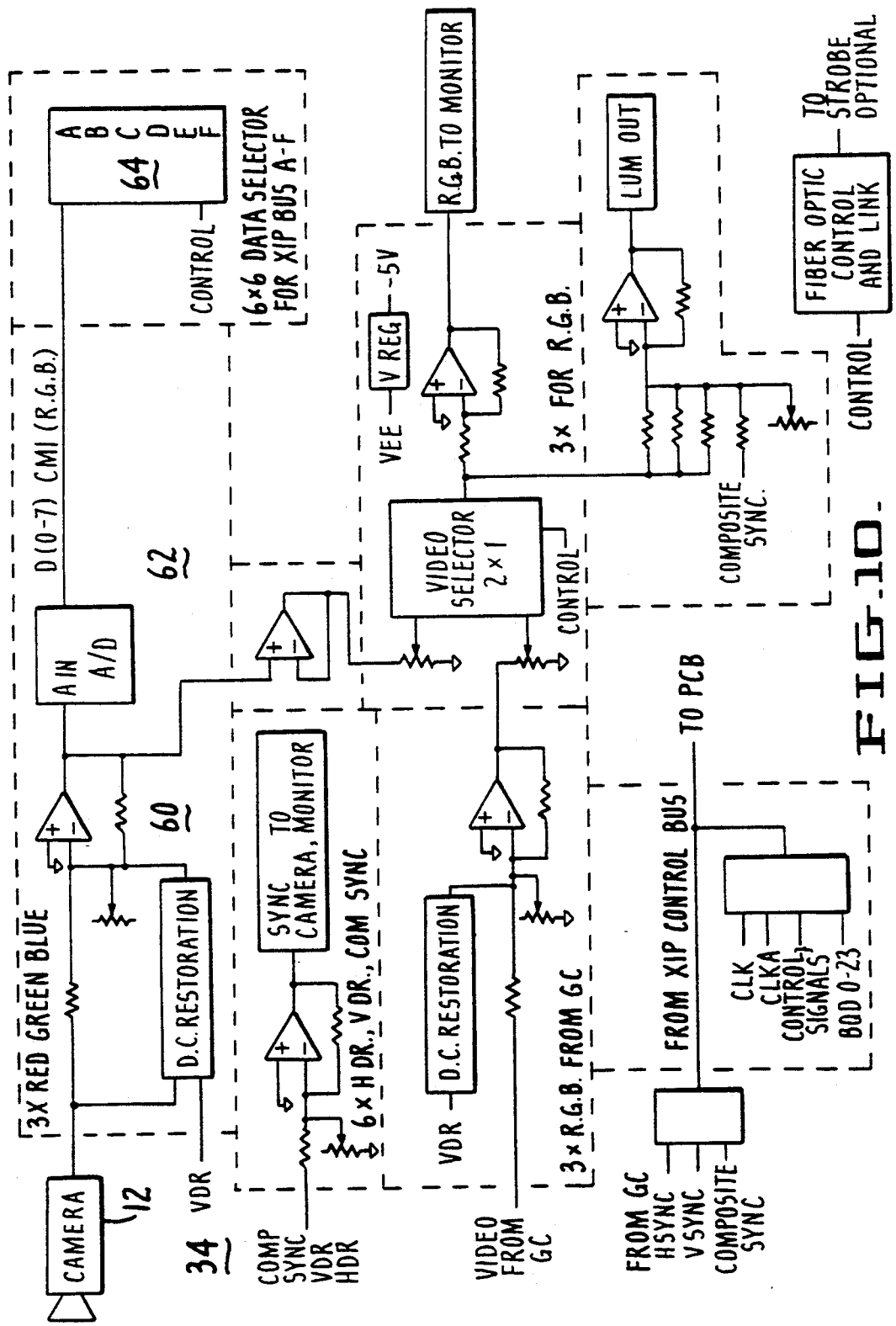
FIG. 10 is a schematic block diagram of the video processor module of the video image processor shown in FIGS. 2 or 6.

The video processor module 34 is shown in block diagram form in FIG. 10. The video processor 34 receives three analog video signals from the color camera 12. The three analog video signals comprising signals representative of the red, green, and blue images, are processed by a DC restoration analog circuit 60. Each of the resultant signals is then digitized by a digitizer 62. Each of the three digitized video signals is the analog video signal from the color camera 12, segmented to form a plurality of image pixels and with each image pixel digitized to form a greyscale value of 8 bits. The digitized video signals are supplied to a 6×6 cross-point matrix switch 64 which outputs the three digitized video signals onto three of the six data buses (42A-42F).

From the data buses 42A-42F, the digitized video signals can be stored in one or more of the image memory modules 38A-38C. The selection of a particular image memory module 38A-38C to store the digitized video signals is accomplished by the address decode circuit 50 connected to the logic unit 52 which activates the particular tri-state transceivers 54, all as previously described. The data selection of which data bus 42 the digitized video images would be sent to is based upon registers in the logic unit 52 which are set by the control bus 32.

Figure 11:
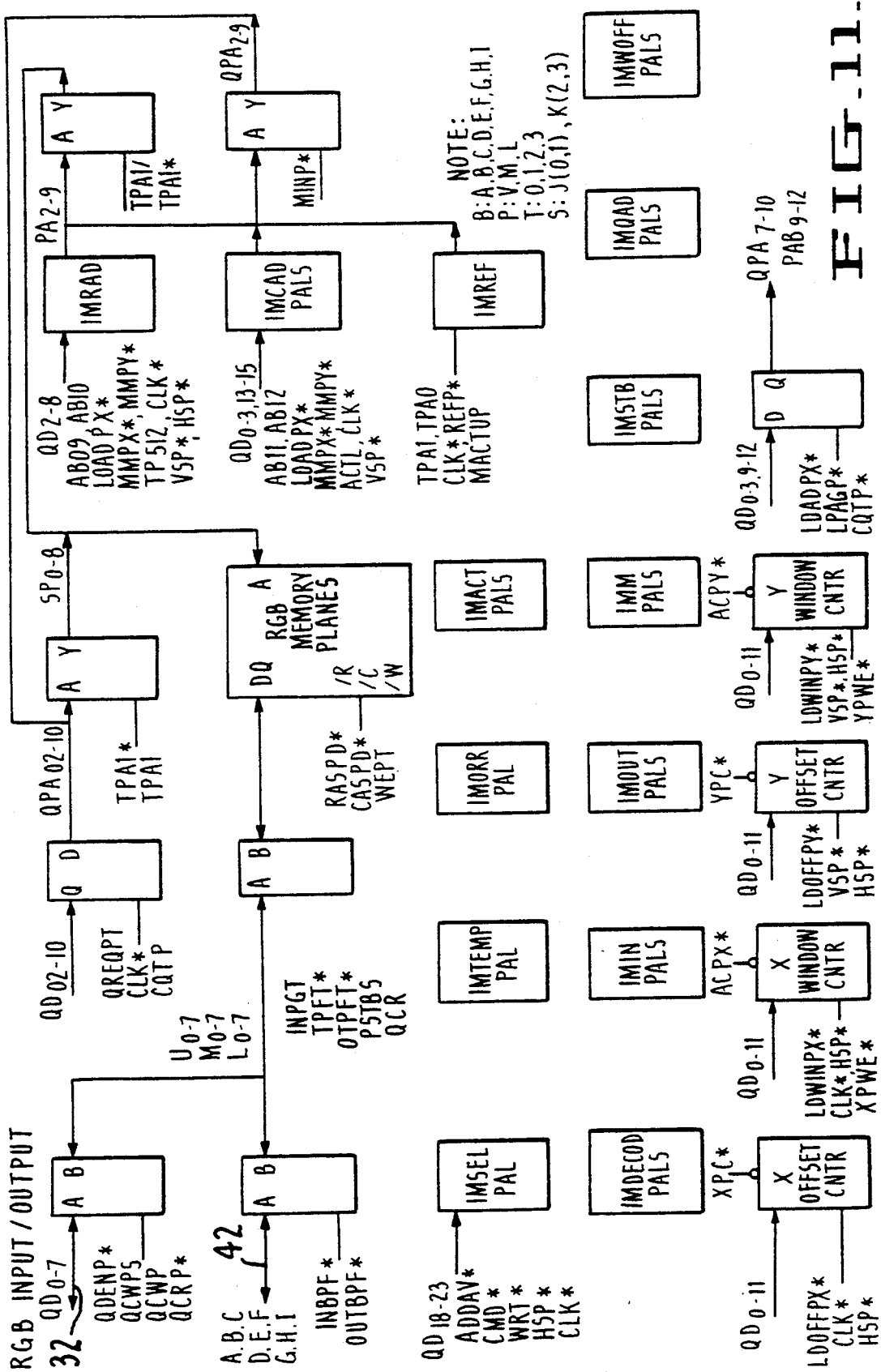
FIG. 11 is a schematic block diagram of an image memory module of the video image processor shown in FIGS. 2 or 6.

A block diagram of an image memory module 38 is shown in FIG. 11. Each of the memory modules 38 contains three megabytes of memory. The three megabytes of memory is further divided into three memory planes: an upper plane, a middle plane, and a lower plane. Each plane of memory comprises 512×2048 bytes of memory. Thus, there is approximately one megabyte of memory per memory plane.

Since each digitized video image is stored in a memory space of 256×256 bytes, each memory plane has room for 16 video images. In total, a memory module has room for the storage of 48 video images. The address of the selection of the particular video image from the particular memory plane within each memory module is supplied along the control bus 32. As the data is supplied to or received from each memory module 38, via the data buses 42, it is supplied to or from the locations specified by the address set on the control bus 32. The three digitized video images from the video processor 34 are stored, in general, in the same address location within each one of the memory planes of each memory module.

Thus, the digital video signal representative of the red video image may be stored in the starting address location of x=256, y=0 of the upper memory plane; the digitized signal representative of the blue video image may be stored in x=256, y=0 of the middle memory plane; and the digital video signal representative of the green video image may be stored in x=256, y=0 of the lower memory plane.

Once the digital video signals representative of the digitized video images are stored in the memory planes of one or more memory modules 38, the digitized video images are operated upon by the morphological processor 40.

Figure 12:
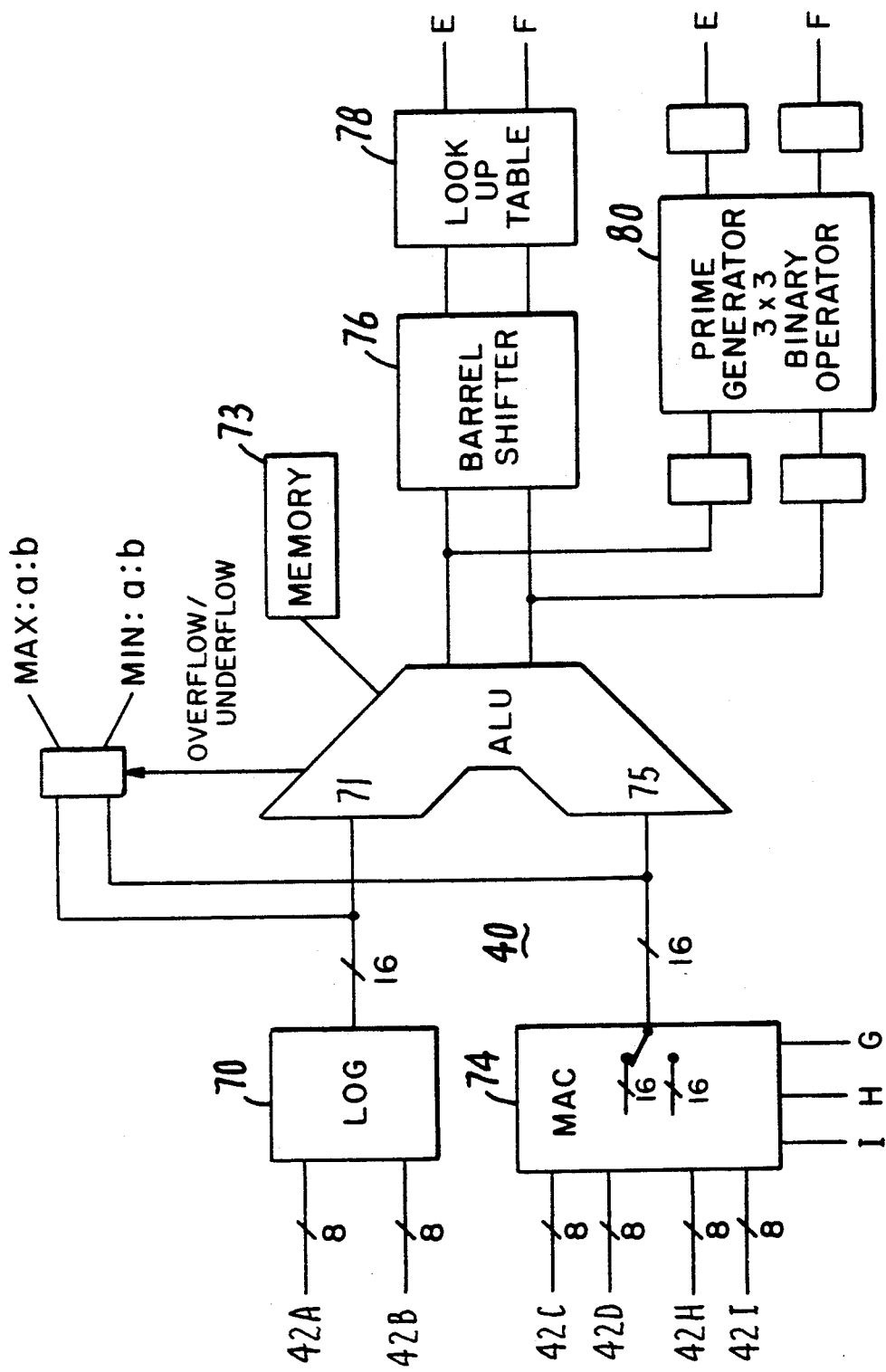
FIG. 12 is a schematic block diagram of a morphological processor module of the video image processor shown in FIGS. 2 or 6.

The morphological processor 40 receives data from the data buses 42A-42D and outputs data to the data buses 42E-42G. Further, the morphological processor 40 can receive input or output data to and from the data buses 42H and 42I. Referring to FIG. 12, there is shown a schematic block diagram of the morphological processor 40. The morphological processor 40 receives data from data buses 42A and 42B which are supplied to a multiplexer/logarithmic unit 70. The output of the multiplexer/logarithmic unit 70 (16 bits) is either data from the data buses 42A and 42B or is the logarithm thereof. The output of the multiplexer/logarithmic unit 70 is supplied as the input to the ALU 72, on the input port 71. The ALU 72 has two input ports: 71 and 75.

The morphological processor 40 also comprises a multiplier accumulator 74. The multiplier accumulator 74 receives data from the data buses 42C and 42D and from the data buses 42H and 42I respectively, and performs the operation of multiply and accumulate thereon. The multiplier accumulator 74 can perform the functions of 1) multiplying the data from (data bus 42C or data bus 42D) by the data from (data bus 42H or data bus 42I); or 2) multiplying the data from (data bus 42C or data bus 42D) by a constant as supplied from the master controller. The result of that calculation is outputted onto the data buses 42I, 42H and 426. The result of the multiply accumulate unit 74 is that it calculates a Green's function kernel in realtime. The Green's function kernel is a summation of all the pixel values from the start of the horizontal sync to the then current pixel. This would be used subsequently in calculation of other properties of the image.

A portion of the result of the multiplier accumulator 74 (16 bits) is also inputted into the ALU 72, on the input port designated as a. The multiplier accumulator 74 can perform calculations of multiply and accumulate that are 32 bits in precision. The result of the multiplier accumulator 74 can be switched by the multiplier accumulator 74 to be the most significant 16 bits or the least significant 16 bits, and is supplied to the a input of the ALU 72.

The output of the ALU 72 is supplied to a barrel shifter 76 which is then supplied to a look-up table 78 and is placed back on the data buses 42E and 42F. The output of the ALU 72 is also supplied to a prime generator 80 which can also be placed back onto the data buses 42E and 42F. The function of the prime generator 80 is to determine the boundary pixels, as described in U.S. Pat. No. 4,538,299.

The ALU 72 can also perform the function of subtracting data on the input port a from data on the input port b. The result of the subtraction is an overflow or underflow condition, which determines a>b or a<b. Thus, the pixel-by-pixel maximum and minimum for two images can be calculated.

Finally, the ALU 72 can perform histogram calculations. There are two types of histogram calculation. In the first type, the value of a pixel (a pixel value is 8 bits or is between 0–255) selects the address of the memory 73. The memory location at the selected address is incremented by 1. In the second type, two pixel values are provided: a first pixel value of the current pixel location and a second pixel value at the pixel location of a previous line to the immediate left or to the immediate right (i.e. diagonal neighbor). The pairs of pixel values are used to address a 64K memory (256×256) and the memory location of the selected pixel is incremented. Thus, this histogram is texture related.

In summary, the morphological processor 40 can perform the functions of addition, multiplication, multiplication with a constant, summation of a line, finding the pixel-by-pixel minimum and maximum for two images, prime generation, and also histogram calculation. The results of the morphological processor 40 are sent along the data buses 42 and stored in the image memory modules 38. The ALU 72 can be a standard 181 type, e.g. Texas Instruments part #ALS181. The multiplier accumulator 74 can be of conventional design, such as Weitech WTL2245.

Figure 13:
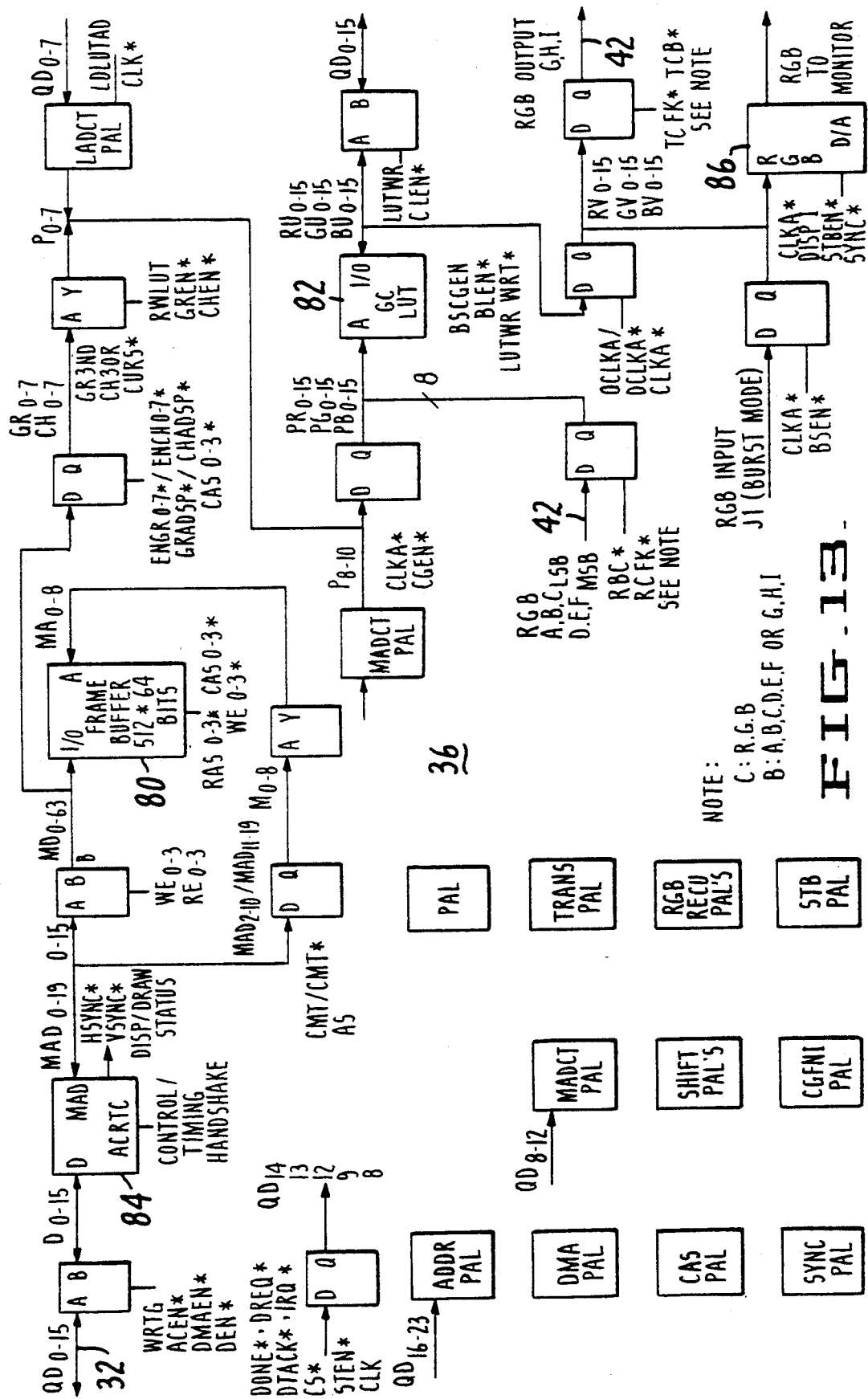
FIG. 13 is a graphic controller module of the video image processor shown in FIGS. 2 or 6.

Referring to FIG. 13, there is shown the graphic controller processor 36, in schematic block diagram form. The function of the graphic controller 36 is to receive processed digitized video images from the memory modules 38, graphic data, and alphanumeric data and combine them for output. The data from the control bus 32 is supplied to an Advanced CRT controller 84. The CRT controller is a part made by Hitachi, part number HD 63484. The output of the advance CRT controller 84 controls a frame buffer 80. Stored within the frame buffer 80 are the graphics and alphanumeric data. The video images from the data buses 42A-42F are also supplied to the graphics controller processor 36. One of the data buses 42 is selected and that combined with the output of the frame buffer 80 is supplied to a look-up table 82. The output of look-up table 82 is then supplied as the output to one of the data buses 42G, 42H or 42I. The function of the graphics control processor 36 is to overlay video alpha and graphics information and then through a D to A to converter 86 is supplied to the monitor 26. In addition, the digital overlayed image can also be stored in one of the image memory modules 38.

The image which is received by the graphics control processor 36 from one of the image memory modules 38 is through one of the data buses 42A-42F. The control signals along the control bus 32 specifies to the image memory module 36 the starting address, the x and y offset with regard to vertical sync as to when the data from the image memory within that memory module 38 is to be outputted onto the data buses 42A-42F. Thus, split screen images can be displayed on the display monitor 26.

Figure 14:
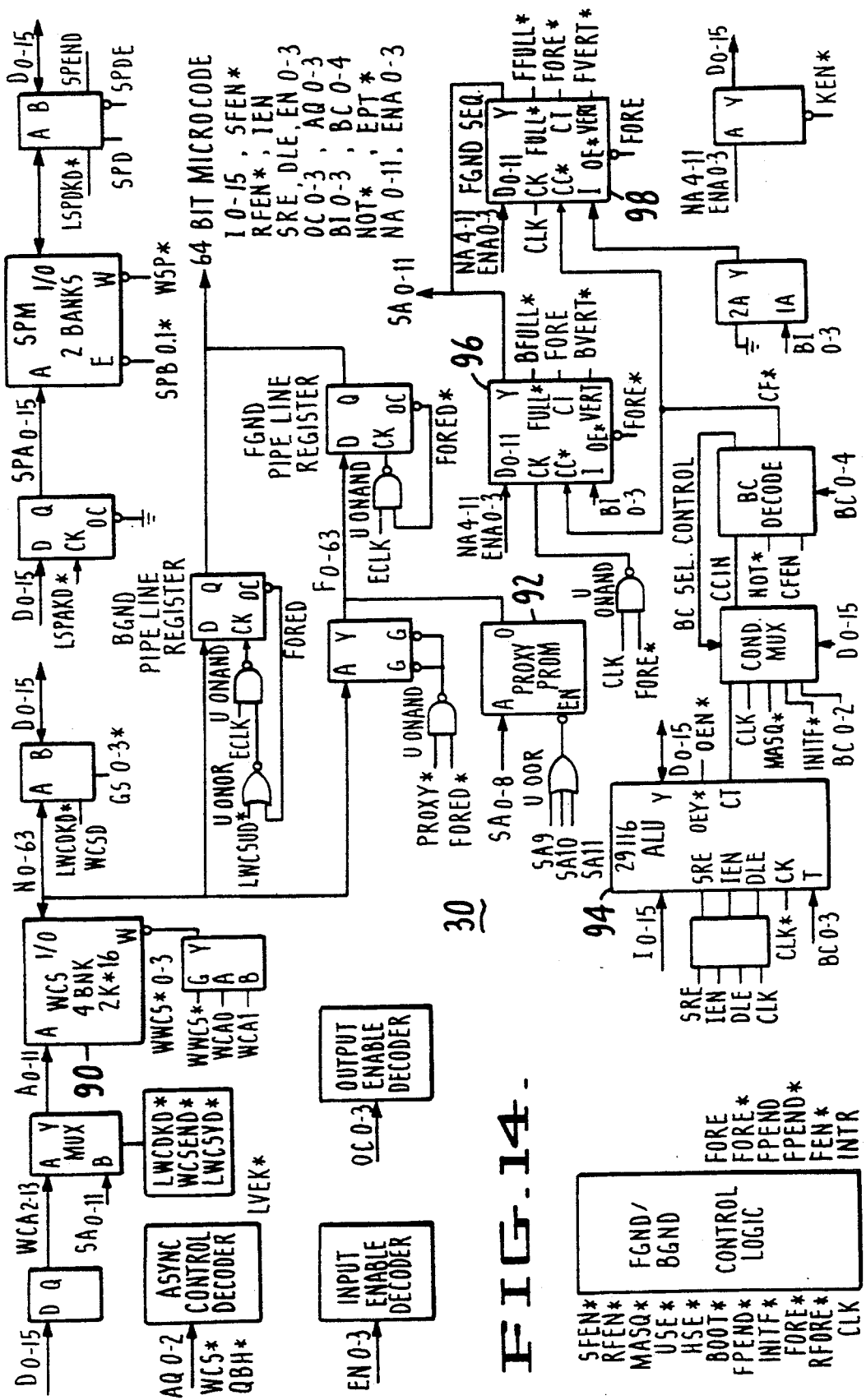
FIG. 14 is a block schematic diagram of the master controller of the video image processor shown in FIGS. 2 or 6.

Referring to FIG. 14, there is shown a schematic block diagram of the master controller 30. The master controller 30, as previously stated, communicates with the host computer 22 via a Q-bus. The master controller 30 receives address and data information from the host computer 22 and produces a 64 bit microcode. The 64 bit microcode can be from the writable control store (WCS) location of the host computer 22 and is stored in WCS 90 or it can be from the proxy prom 92. The control program with the proxy prom 92 is used upon up as WCS 90 contains volatile RAM. The 64 bit microcode is processed by the 29116 ALU 94 of the master controller 30. The master controller 30 is of the Harvard architecture in that separate memory exists for instruction as well as for data. Thus, the processor 94 can get instruction and data simultaneously. In addition, the master controller 30 comprises a background sequencer 96 and a foreground sequencer 98 to sequence series of program instruction stored in the writable control storage 90 or the proxy prom 92. The Q-bus memory map from which the master controller 30 receives its writable control store and its program memory is shown as below:

| ADDRESS (HEXADECIMAL) | Use |
|---|---|
| 3FFFFF <br> . <br> 3FE000 | BS7 (Block 7 conventional Digital Equipment Corp. nonemclature) |
| 3FDFFF <br> 3FA000 | Scratch Pad |
| 387FFF <br> 380000 | Writable Control Store |
| 37FFFF <br> 280000 | Image Memory Window |
| 1FFFFF <br> 0 | Host Computer Program Memory |

In addition, the control signals ADAV, CMD and WRT have the following uses.

| CONTROL SIGNALS | | | |
|---|---|---|---|
| ADAV | CMD | WRT | Use |
| 0 | X | X | Quiescent Bus |
| 1 | 1 | 0 | Read Register |
| 1 | 1 | 1 | Write Register |
| 1 | 0 | 0 | Read Image Memory |
| 1 | 0 | 1 | Write Image Memory |

The master controller 30 operates synchronously with each one of the modules 34, 36, 38 and 40 and asynchronously with the host computer 22. The clock signal is generated by the master controller 30 and is sent to every one of the modules 34, 36, 38 and 40. In addition, the master controller 30 starts the operation of the entire sequence of video image processing and video image storing upon the start of vertical sync. Thus, one of the signals to each of the logic units 52 is a vertical sync signal. In addition, horizontal sync signals may be supplied to each one of the logic units.

Figure 15:
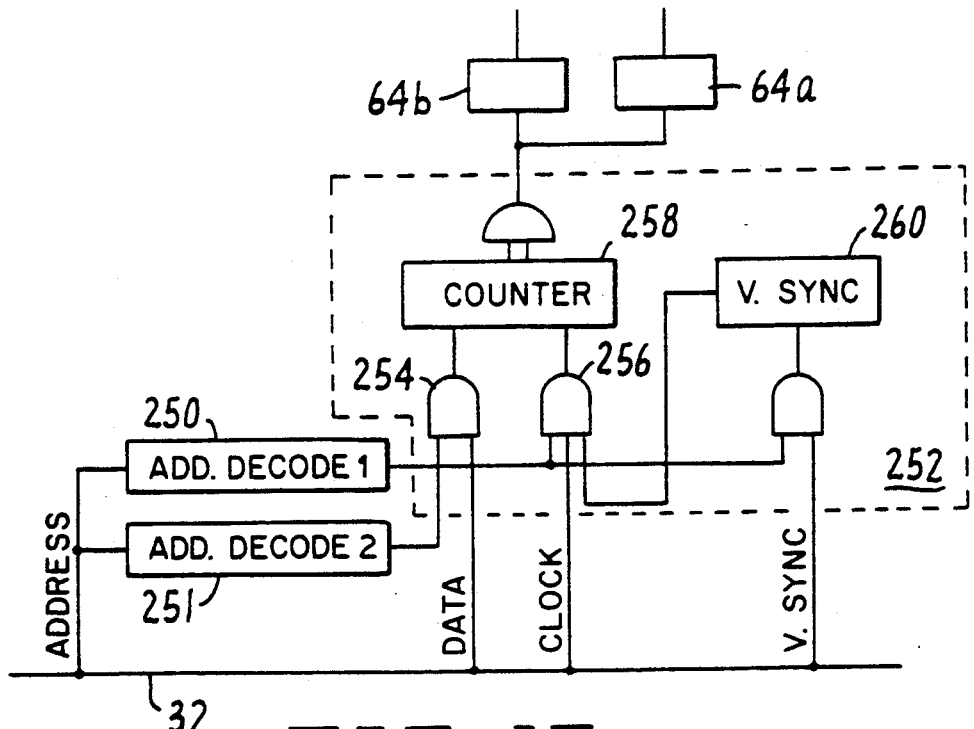
FIG. 15 is a circuit diagram of another implementation of a logic unit.

The logic units may also contain logic memory elements that switch their respective tri-state transceivers at prescribed times with respect to the horizontal sync and the vertical sync signals. Referring to FIG. 15, there is shown a schematic diagram of another embodiment of a logic unit 252. The logic unit 252 is connected to a first address decode circuit 250 and a second address decode circuit 251. The logic unit 252 comprises a first AND gate 254, a second AND gate 256, a counter 258 and a vertical sync register 260.

Prior to the operation of the logic unit 252, first address decode circuit 250 is activated loading the data from the data lines of the control bus 32 into the counter 258.

Thereafter, when the second address decode circuit 251 is activated, and vertical sync signal is received, the counter 258 counts down from each clock pulse received. When the counter 258 reaches zero, the tri-state registers 64a and 64b are activated.

It should be emphasized that the master controller 30, each one of the processing modules 34, 36, 38 and 40 and each one of the image memory modules 38 can be of conventional design. The master controller 30 controls the operation of each one of the modules along a separate control bus 32. Further, each of the modules communicates with one another by a plurality of data buses 42. The interconnection of each one of the modules (34-40) with one or more of the data buses 42 is accomplished by means within the module (34-40) which is controlled by the control signals along the control bus 32. The interconnection of the data buses 42 to the electronic function within each of the modules is as previously described. However, the electronic function within each of the modules, such as memory storage or processing can be of conventional architecture and design.

In the apparatus 8 of the present invention, an image of the field of view as seen through the microscope 16 is captured by the color camera 12. The into an electrical image of the field of view. In reality, three electrical images are converted. The electrical images from the color camera 12 are processed by the image processor 10 to form a plurality of different representations of the electrical image. Each different representation is a representation of a different parameter of the field of view. One representation is the area of interest. Another representation is the integrated optical density.

Referring to FIG. 16 there is shown an example of the digitized electrical signal representative of the electrical image of the field of view. The digitized image shown in FIG. 16 is the result of the output of the video processor module 34, which segments and digitizes the analog signal from the color camera 12. (For the purpose of this discussion, only one electrical image of the field of view will be discussed. However, it is readily understood that there are three video images, one for each color component of the field of view.) As shown in FIG. 16, each pixel point has a certain amplitude representing the greyscale value. The object in the field of view is located within the area identified by the line 200. Line 200 encloses the object in the field of view.

As previously stated, the image processor 10 and more particularly the morphological processor module 40 processes the digitized video image to form a plurality of different processed digitized video images, with each different processed digitized video image being a different representation of the digitized video image.

One representation of the electrical image shown in FIG. 16 is shown in FIG. 17. This is the representation which represents a Green's function kernel for the area of the image in the field of view. In this representation, a number is assigned to each pixel location with the numbers being sequentially numbered started from left to right. While FIG. 17 shows pixel at the location X=0, Y=0 (as shown in FIG. 16) as being replaced by the number 1 and the number being sequential therefrom, any other number can also be used. In addition, the number assigned to the beginning pixel in each line can be any number—so long as each successive pixel, in the same line, differs from the preceding pixel by the number 1.

Another representation of the electrical image of the example shown in FIG. 16 is a Green's function kernel for the integrated optical density of the image in the field of view as shown in FIG. 18. In this representation, each pixel location $P(X_m, Y_n)$ is assigned a number which is calculated in accordance as follows:

$$P(X_m, Y_n) = \sum_{i=1}^{m} P(X_i, Y_n)$$

As previously discussed, the morphological processor 40 is capable of calculating a Green's function kernel for the integrated optical density "on the fly" or in "real-time".

The video image processor 10 also receives the electrical image from the color camera 12 and generates positional information that represents the boundary of the object contained in the field of view. One method of calculating the positional information that represents the boundary of the object view is disclosed in U.S. Pat. No. 4,538,299, which is incorporated by reference. As disclosed in the '299 patent, the digitized greyscale value (e.g. the image in FIG. 16) is compared to a pre-set threshold value such that as a result of the comparison, if the greyscale at the pixel location of interest exceeds the pre-set threshold value, then the value "1" is assigned to that pixel location. At all other locations if the greyscale value of the pixel of interest is below the pre-set threshold value, then a "0" is assigned at that location. As a result, the digital video image is converted to a representation where a value of "1" is assigned where there is an object and a value of "0" is assigned at locations which is outside the boundary of the object. An example of the conversion of the image shown in FIG. 16 by this method is the representation shown in FIG. 19.

Thereafterwards, and in accordance with the '299 patent, the representation, as shown in FIG. 19, is converted to a third representation by assigning a value to a pixel with a location (X,Y) in accordance with $$P(X,Y) = a*2^7 + b*2^6 + c*2^5 + d*2^4 + e*2^3 + f*2^2 + g*2 + h$$

wherein a,b,c,d,e,f,g,h are the values of the eight nearest neighbors surrounding the pixel (X,Y) in accordance with

| g | d | h |
|---|---|---|
| c | pixel (X,Y) | a |
| f | b | e |

This can be done by the prime generator 80 portion of the morphological processor 40.

Finally, in accordance with the '299 patent, this third presentation is scanned until a first non-zero P(X,Y) value is reached. The P(X,Y) value is compared along with an input direction value to a look-up table to determine the next location of the non-zero value of P(X,Y) and forming a chaining code. In accordance with the teaching of the '299 patent, a positional information showing the location of the next pixel which is on the boundary of the object in the field of view is then generated. This positional information takes the form of Delta X= +1, 0, or 31 1 and Delta Y= +1, 0, or −1.

This generated positional information is also supplied to trace the locations in each of the other different representations.

For example, if the first value of the boundary scanned out is X=4, Y=1 (as shown in FIG. 19) that positional information is supplied to mark the locations in the representations shown in FIGS. 17 and 18, thereby marking the start of the boundary of the object in those representations. Thus, in FIG. 17, the pixel location, having the value 13, is initially chosen. In FIG. 18, the pixel location having the value 44 is initially chosen.

In accordance with the teaching of the 3 299 patent, the next positional information generated which denotes the next pixel location that is on the boundary of the object in the field of view would be Delta X= +1, Delta Y= +1. This would bring the trace to the location X=5, Y=2. That positional information is also supplied to the representations for the area, shown in FIG. 17 and to the representation denoting the integrated optical density, as shown in FIG. 18. The trace caused by the positional information would cause the representation in FIG. 17 to move the pixel location X=5, Y=2 or where the pixel has the value 22. Similarly, in FIG. 18, the trace would cause the pixel location X=5, Y=2 or the pixel having the value 76 to be traced. As the boundary of the object is traced, the same positional information is supplied to other representations denoting other parameters of the images of the field of view—which inherently do not have information or the boundary of the object in the field of view.

It should be emphasized that although the method and the apparatus heretofore describes the positional information as being supplied by the teaching disclosed in the '299 patent, the present invention is not necessarily limited to positional information based upon the '299 patent teaching. In fact, any source of positional information can be used with the method and apparatus of the present invention, so long as that information denotes the position of the boundary of the object in the field of view.

As the boundary of the object in the field of view is traced out in each of the different representations, that represent the different parameters of the object in the field of view, the different parameters are calculated. Further, the calculation of certain parameters may not depend on the boundary of the object. They may, instead, depend upon the position being inside the boundary of the object. Thus, once the boundary of the object in the field of view is determined, either positions on the boundary or positions interior to the boundary are traced out in identical corresponding positions in each of the different representations.

For example, to calculate the area of the object in the field of view, one takes the positional information and determine the value of the pixel at that location. Thus, the first pixel value would have the value 13. Except for the first pixel, the location of the current pixel $(X_m, Y_n)$ is compared to the location of the previously traced pixel $(X_j, Y_k)$ such that if $Y_n$ is less than $Y_k$ then the present value at $P_i(X_m, Y_n)$ is added to the value A. If $Y_n$ is greater than $Y_k$ the the present value at $P_i(X_m-1, Y_n)$ is added to B, B is subtracted from A to derive the area of the object of view. The calculation is shown in FIG. 20.

Similarly, for the calculation of the integrated optical density, if the present pixel location $(X_m, Y_n)$ compared to the previously traced pixel location $(X_j, Y_k)$ is such that $Y_n$ is less than $Y_k$, then $P_i(X_m, Y_n)$ is added to A. If $Y_n$ is greater than $Y_k$ then $P_i(X_m-1, Y_n)$ is added to B. B is subtracted from A to derive the integrated optical density of the object. This is shown in FIG. 21.

There are many advantages to the method and apparatus of the present invention. First and foremost is that as the positional information regarding the boundary of an object of view is provided, multiple parameters of that object can be calculated based upon different representations of the image of the field of view containing the object—all of which representations do not inherently contain any positional information regarding the location of the boundary of the object in the field of view. Further, with the video image processor described, such different parameters can be calculated simultaneously, thereby greatly increasing image processing throughput.

What is claimed is:

1. A method for generating a plurality of parameters of an object in a field of view, said method comprising the steps of:

(a) forming an electrical image of said field of view;
   (b) (1) segmenting said electrical image into a plurality of pixels and digitizing the image intensity of each pixel into an electrical signal representing the greyscale value;
   (b) (2) processing said electrical signals to form a plurality of different representations of said electrical image; wherein each different representation is a representation of a different parameter of said field of view, with one of said plurality of parameters of said object being the integrated optical density of said object;
   (c) generating positional information that represents the boundary of said object;
   (d) tracing locations in each of said different representation in response to the positional information generated; and
   (e) calculating the different parameters from each of said different representations based upon locations traced in each of said different representations.

2. The method of claim 1 said locations traced in step (d) correspond to positions along the boundary of said object.

3. The method of claim 1 wherein said locations traced in step (d) correspond to positions interior to the boundary of said object.

4. The method of claim 1 wherein another of said plurality of parameters of said object is the area of said object.

5. The method of claim 4 wherein said step (b) (2) further comprises the steps of:

assigning a number to each pixel location with said numbers being sequential starting from left to right for the representation that is a representation of the area of said field of view.

6. The method of claim 5 wherein said step (e) further comprises the steps of:

(i) if present pixel location $(X_m, Y_n)$ compared to previously traced pixel location
      $(X_j, Y_k)$ is such that
      $Y_n < Y_k$, then adding present pixel value $P_i(X_m-1, Y_i)$ to B
   (ii) subtracting B from A to derive the area of said object.

7. The method of claim 1 wherein said step (b) (2) further comprises the steps of:

assigning a number to each pixel location $(X_m, Y_n)$ with said number calculated as follows $$P(X_m, Y_n) = \sum_{i=1}^{m} P(X_i, Y_n)$$

where $P(X_i, Y_n)$ is the grey scale value at the pixel location of $(X_i, Y_n)$, for the representation that is a representation of the integrated optical density of said field of view.

8. The method of claim 7 wherein said step (e) further comprises the steps of:
(i) if present pixel location $(X_m, Y_n)$ compared to the previously traced pixel location $(X_j, Y_k)$ is such that
$Y_n < Y_k$, then adding present pixel value $Pi(X_m, Y_n)$ to A
$Y_n > Y_k$, then adding present pixel value $P_i(X_m-1, Y_n)$ to B
(ii) subtracting B from A to derive the integrated optical density of said object.

9. The method of claim 1 wherein said step (c) further comprises the steps of:
(c)(1) segmenting said electrical signal into a plurality of pixels and digitizing the image intensity of each pixel into an electrical signal representing the greyscale value to form a first representation of said image;
(c)(2) processing the electrical signal of each of said greyscale value of said first representation to form a second representation of said image by comparing the greyscale value of each pixel to a pre-set threshold value such that as a result a "0" is assigned at each pixel location which is outside the boundary of said object and a "1" is assigned everywhere else;
(c)(3) converting said second representation into a third representation by assigning a value to a pixel (x,y) in accordance with $$P(X,Y) = a*2^7 + b*2^6 + c*2^5 + d*2^4 + e*2^3 + f*2^2 + g*2 + h$$

where a,b,c,d,e,f,g,h are the values of the eight nearest neighbors surrounding pixel (X,Y) in accordance with

| g | d | h |
|---|---|---|
| c | pixel (X,Y) | a |
| f | b | e. |

10. The method of claim 9 wherein said step (d) further comprises the steps of:
scanning said third representation until a first non-zero P(X,Y) value is reached;
comparing said P(X,Y) value and an input direction value to a look-up table to determine the next location of the non-zero value of P(X,Y) and forming a chaining code.

11. An apparatus for generating a plurality of parameters of an object in a field of view, said apparatus comprising:
imaging means for forming an electrical image of said field of view;
means for segmenting said electrical image into a plurality of pixels and digitizing the image intensity of each pixel into an electrical signal representing the greyscale value;
means for processing said electrical signals to form a plurality of different representations of said electrical image; wherein each different representation is a representation of a different parameter of said field of view, with one of said plurality of parameters of said object being the integrated optical density of said object;
means for generating positional information that represent the boundary of said object;
means for simultaneously tracing identical corresponding locations in each of said different representations in response to the positional information generated; and
means for calculating the different parameters from each of said different representations based upon locations traced in each of said different representations.

12. The apparatus of claim 11 wherein another of said plurality of parameters of said object is the area of said object.

13. The apparatus of claim 12 wherein said processing means further comprises:
means for assigning a number to each pixel location with said numbers being sequential starting from left to right for the representation that is a representation of the area of said field of view.

14. The apparatus of claim 13 wherein said calculating means further comprises:
means for adding the value of the present pixel location $P_i(X_m, Y_n)$ to A if $Y_n < Y_k$ and $P_i(X_m-1, Y_i)$ to B if $Y_n > Y_k$ where $Y_k$ is the Y component of $(X_j, Y_k)$, the location of the immediately preceding pixel that was traced, and
means for subtracting B from A to derive the area of said object.

15. The apparatus of claim 11 wherein said processing means further comprises:
means for assigning a number to each pixel location $(X_m, Y_n)$ with said number calculated as follows:

$$P(X_m, Y_n) = \sum_{i=1}^{m} P(X_i, Y_n)$$

where $P(X_i, Y_n)$ is the greyscale value at the pixel location of $(X_i, Y_n)$.

16. The apparatus of claim 15 wherein said calculating means further comprises:
means for adding the value of the present pixel location $P_i(X_m, Y_n)$ to A if $Y_n < Y_k$ and $P_i(X_m-1, Y_n)$ to B if $Y_n > Y_k$ where $Y_k$ is the Y component of $(X_j, Y_k)$, the location of the immediately preceding pixel that was traced; and
means for subtracting B from A to derive the integrated optical density of said object.

17. The apparatus of claim 11 wherein said generating means further comprises:
means for forming a first representation of said image by segmenting said image into a plurality of pixels and digitizing the image intensity of each pixel into an electrical signal representing the greyscale value;
means for processing the electrical signal of each of said greyscale value to form a second representation of said image;
logic means for converting said second representation into a third representation whereby the value of a pixel at a location (hereinafter: pixel (X,Y)) in the second representation and the values of the nearest adjacent neighbors of said pixel at said location are converted into a single value at said corresponding location (hereinafter: P(X,Y)) in said third representation;
storage means for storing said third representation; and
table means for storing various possible values of P(X,Y), said table means for receiving a value of P(X,Y) and an input direction value, and for producing an output direction value to indicate the next location of P(X,Y) having a non-zero value, said non-zero values of P(X,Y) form the boundary of said object.

18. The apparatus of claim 17 wherein said logic means is adapted to convert said second representation in accordance with the following rules:
   (1) If pixel (X,Y)=0, then assign 0 to P(X,Y);
   (2) If pixel (X,Y)=1, and all eight nearest neighbors of pixel (X,Y)=0, then assign 0 to P(X,Y);
   (3) If pixel (X,Y)=1 and all four nearest neighbors of pixel (X,Y)=1, then assign 0 to P(X,Y);
   (4) Otherwise assign a non-zero value to P(X,Y) wherein said value assigned to P(X,Y) is a number composed of the values of the eight nearest neighbors of pixel (X,Y).

* * * * *